(12) United States Patent
Duffy et al.

(10) Patent No.: US 8,351,461 B2
(45) Date of Patent: Jan. 8, 2013

(54) METHOD AND APPARATUS FOR NETWORK BASED FIXED MOBILE CONVERGENCE (75) Inventors: Dennis Duffy, Decatur, GA (US);
Daniel Guyette, Hartford, WI (US);
Myranda Johnson, Smyrna, GA (US);
Stephanie P. Parlamas, Colts Neck, NJ (US); Steven A. Siegel, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 551 days.

(21) Appl. No.: 12/611,891

(22) Filed: Nov. 3, 2009

(65) Prior Publication Data
US 2010/0111079 A1 May 6, 2010

Related U.S. Application Data

(60) Provisional application No. 61/110,791, filed on Nov. 3, 2008.

(51) Int. Cl.
*H04J 3/16* (2006.01)
(52) U.S. Cl. ........................................ 370/467
(58) Field of Classification Search ................. 370/467; 709/224; 706/4, 8, 6, 226; 379/265.09, 88.17, 379/201.02
See application file for complete search history.

(56) References Cited

U.S. PATENT DOCUMENTS 7,792,275 B2 * 9/2010 Tai et al. ................. 379/265.09
2008/0155659 A1 * 6/2008 Gazier et al. .................... 726/4

* cited by examiner

*Primary Examiner* — Fan Ng (57) ABSTRACT

A method and apparatus for providing a network based Fixed Mobile Convergence (FMC) service are disclosed. For example, the method receives a NB-FMC call request originating from a Session Initiation Protocol (SIP) NB-FMC endpoint device or a non-SIP NB-FMC endpoint device, and processes the NB-FMC call request using a single hosted NB-FMC Application Server (AS).

17 Claims, 3 Drawing Sheets

METHOD AND APPARATUS FOR NETWORK BASED FIXED MOBILE CONVERGENCE

This application claims the benefit of U.S. Provisional Application No. 61/110,791 filed on Nov. 3, 2008, which is herein incorporated by reference.

The present invention relates generally to communication network and, more particularly, to a method and apparatus for enabling network based Fixed Mobile Convergence (FMC).

BACKGROUND OF THE INVENTION

Fixed Mobile Convergence (FMC) capabilities allow a subscriber to access the same or near-equivalent features over both mobile and wireline devices. Existing FMC solutions of customer premise based Public Branch eXchange (PBX) have focused on providing solutions that involve routing calls to and from a mobile device via a customer premise PBX in order to access the same PBX service features applicable for wireline devices. This approach results in inefficient use of an enterprise customer's access interface and does not allow FMC users to access complementary and value-added features available from a service provider network.

In addition, customer premise PBX based FMC solutions typically route calls to the customer premise PBX of an enterprise customer. Therefore, feature processing at the customer premise PBX is performed independently and transparently of a service provider network. Existing customer premise PBXs do not support an interface that can communicate local service logic and data to a service provider network. Thus, such existing FMC solutions do not enable the integration of network based FMC service features provided by a service provider with customer premises based PBX service features supported by a customer premise PBX.

SUMMARY OF THE INVENTION

In one embodiment, the present invention discloses a method and apparatus for providing a network based Fixed Mobile Convergence (FMC) service. For example, the method receives a NB-FMC call request originating from a Session Initiation Protocol (SIP) NB-FMC endpoint device or a non-SIP NB-FMC endpoint device, and processes the NB-FMC call request using a single hosted NB-FMC Application Server (AS).

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

There is no current method for using information resident in a customer premise-based PBX by the network service provider to provide IMS services. For example, current Fixed Mobile Convergence (FMC) solutions may not result in the efficient use of an enterprise customer's access interface. They do not allow the Service Provider network the ability to access complementary and value-added features available from a customer premise PBX. Moreover, existing customer premise PBXs do not support an interface that can communicate local service logic and data to a service provider network. Thus, existing customer premise PBXs do not enable the integration of network based FMC service features provided by a service provider and customer premises based PBX service features supported by a customer premise PBX.

To address this criticality, the present invention enables a network based FMC (NB-FMC) communication network that allows users of mobile devices to receive service features of communication Application Servers (e.g. network-based or premises based Application Servers) using a single hosted NB-FMC architecture. This approach provides a network based Fixed Mobile Convergence (NB-FMC) service that integrates both customer premise-based and network-based service features across wireless and wireline devices, while making efficient use of the enterprise customer's access interface.

Broadly, the capabilities of the network based FMC (NB-FMC) architecture include registering, managing, and routing user traffic as well as infusing related services provided by wireless and wireline service provider networks by introducing a cross-service NB-FMC architecture. The NB-FMC architecture enables users of mobile devices to access multiple existing enterprise services while extending new NB-FMC capabilities to the users to provide an integrated service experience across multiple access technologies. The present invention provides access to these capabilities across a mixed environment of endpoint devices including wireline and wireless endpoint devices, Time Division Multiplexing (TDM) and Internet Protocol (IP) endpoint devices, standard cellular and smart phone mobile devices. The present invention provides service feature functionality and flexibility that currently do not exist.

The present invention uses an application server, e.g., a NB-FMC Application Server (AS), that enables Fixed Mobile Convergence (FMC) across multiple existing services in a single solution. Since a single hosted NB-FMC AS is used to support NB-FMC capabilities, the need to converge multiple different existing networks is unnecessary; therefore, major network investment can be avoided. The NB-FMC AS is responsible for tying multiple service networks together to create an integrated service experience to the end users. In one embodiment, in order to deliver NB-FMC capabilities, a NB-FMC client is installed on the mobile devices to invoke the NB-FMC service features. Alternatively, in another embodiment, if the NB-FMC client is not installed on the mobile devices, the present invention will still be able to invoke the NB-FMC service features for the mobile devices. Thus, the present invention can be applied to a broad portfolio of enterprise service offers.

In one embodiment, the present invention utilizes the Internet Protocol Multimedia Subsystem (IMS) based architecture to introduce NB-FMC capabilities into a service provider network. The present invention extends existing enterprise services to the end users of mobile devices, thereby providing the end users of mobile devices as well as fixed wireline devices the same or near equivalent user experience and common features.

Figure 1:
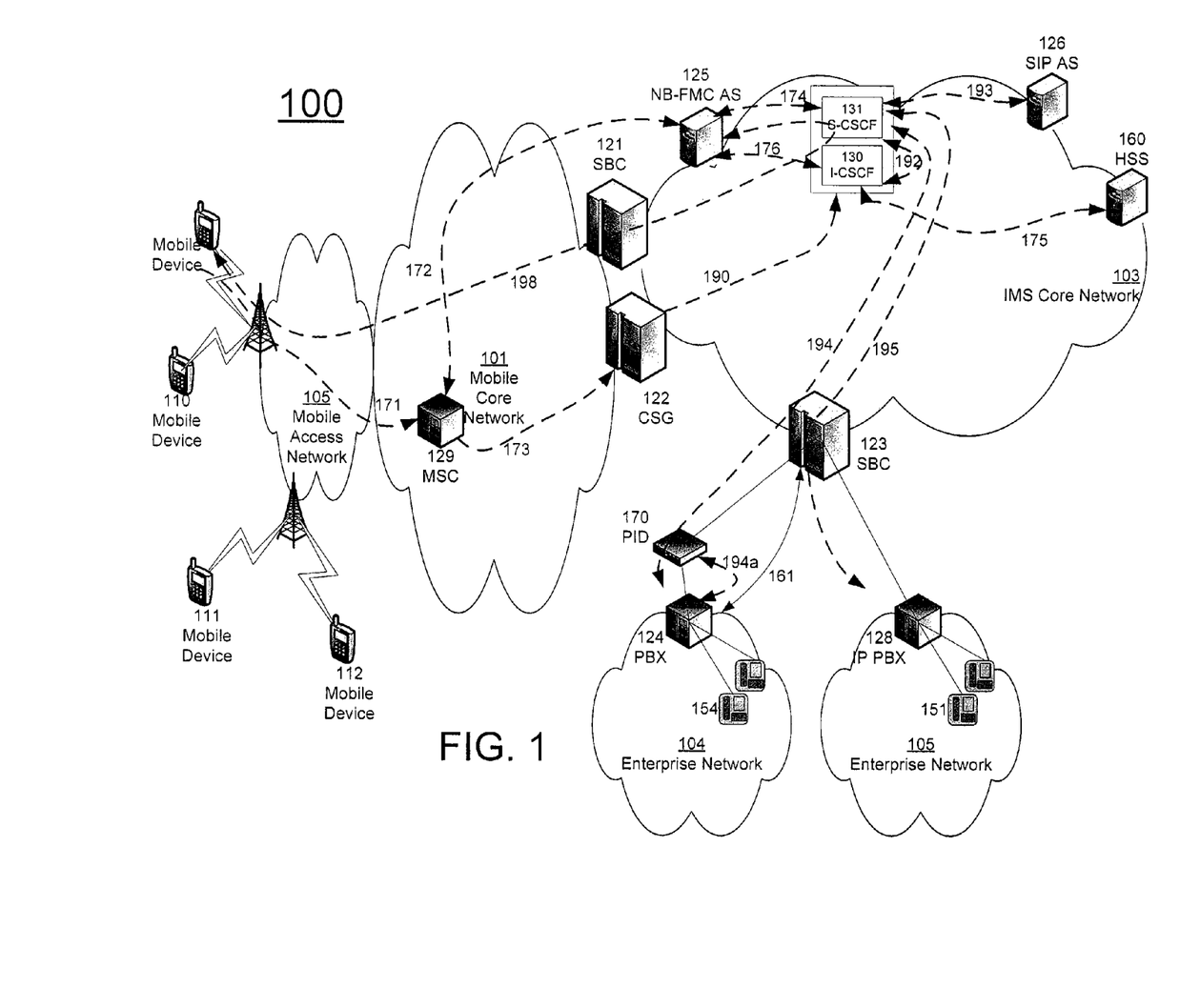
FIG. 1 illustrates an exemplary network based FMC (NB-FMC) communication network related to the present invention.

FIG. 1 illustrates an exemplary network based FMC communication network 100 related to the present invention. In FIG. 1, NB-FMC communication network 100 comprises multiple core networks, such as IMS core network 103 and mobile core network 101. Mobile core network 101 is connected to the IMS core network 103 via a Session Border Controller (SBC) 121 and a Circuit Switched Gateway (CSG) 122.

In one embodiment, in the mobile core network 101, the functions performed by a Gateway Mobile Switching Center (GMSC) are incorporated into the Circuit Switched Gateway (CSG) 122, thereby resulting in a single network element. This supports greater efficiency in routing calls through mobile core network 101 and the IMS core network 103. The CSG 122 serves to anchor all mobile device originated NB-FMC calls and mobile device terminated NB-FMC calls, e.g., by using the Mobile Subscriber Integrated Service Digital network (MSISDN) number of the mobile devices. The CSG 122 is also responsible for handling signaling communications with IMS core network 103.

Broadly defined, IMS is an architectural framework for delivering Internet Protocol (IP) multimedia services to mobile users defined by the standard body, 3rd Generation Partnership Project (3GPP). In one embodiment, a SBC is a network element that provides the security boundary for the IMS network infrastructure. The SBC provides traffic controls, protocol verification, protocol conversion, hosted NAT, session managed media anchor or release, and records CDR events. The SBC exposes its well known address(es) within the IMS network and is the first trusted element of the Service Provider network infrastructure. It includes the Proxy Call Session Control Function (P-CSCF) and Access Border Gateway (A-BGF) IMS functions as defined by 3GPP and other standards bodies.

In one embodiment, a Circuit Switched Gateway (CSG) is a network element that interconnects a circuit switched network, e.g., a Public Switched Telephone Network (PSTN) and a packet switched network, e.g., an IMS network. For example, the CSG network element performs the necessary conversion functions including, but not limited to, media and signaling protocol interworking, between a circuit switched network and an IMS core network.

Customer premise PBX 124 residing in an enterprise network 104 is connected to the IMS core network 103 via the SBC 123. The customer premise PBX 124 may communicate directly with the SBC 123 via flow 161 or via a PBX intermediary device (PID) 170 (broadly an intermediary device). It should be noted that although the PID 170 is illustrated as being deployed between the SBC 123 and the PBX 124, the PID 170 could be deployed on either side of the SBC. Furthermore, it should be noted that the PID 170 could be a separate device as shown in FIG. 1 or could be integrated into the SBC 123. It should be noted that PID 170 is a service provider managed device.

For PBX users, there is a need to share service logic and data across customer premise and service provider networks. In order to support this sharing, in one embodiment the present invention treats the customer premise IP PBX 128 and IP PBX 181 as Application Servers (ASs) associated with the IMS core network 103. Similarly, the present invention treats customer premise PBX 124 as an AS associated with the IMS core network 103 through the use of the PID 170. Using the customer premise PBX serving as an AS approach, the NB-FMC service environment borders are extended beyond the IMS core network 103. For example, in one embodiment the present invention allows the IMS core network 103 to communicate with a PBX using AS to AS communication, e.g., AS 126 to IP PBX AS 128, AS 126 to PBX AS 124 via PID 170, or AS 126 to IP PBX AS 181, for feature integration and management.

In one embodiment, the enterprise customer of the enterprise network 104 has subscribed on behalf of the FMC users of the network devices 154 behind the PBX to the NB-FMC service provided by the IMS core network 103. In one embodiment, the PID 170 acts as a SIP Application Server (AS) interfacing with the IMS core network 103. The PID provides the necessary interworking between the service provider network and a customer premise PBX, that does not support a direct AS interface using Session Initiation Protocol (SIP), to facilitate the access of customer premise PBX service logic and data by the service provider network. Note that IMS Core Network 103 does not support a signaling interface that can be used to access PBX-based service logic and data. For example, PBX 124 can be a Time Division Multiplexing (TDM) PBX. Therefore, PID 170 is required to facilitate such communications.

Figure 3:
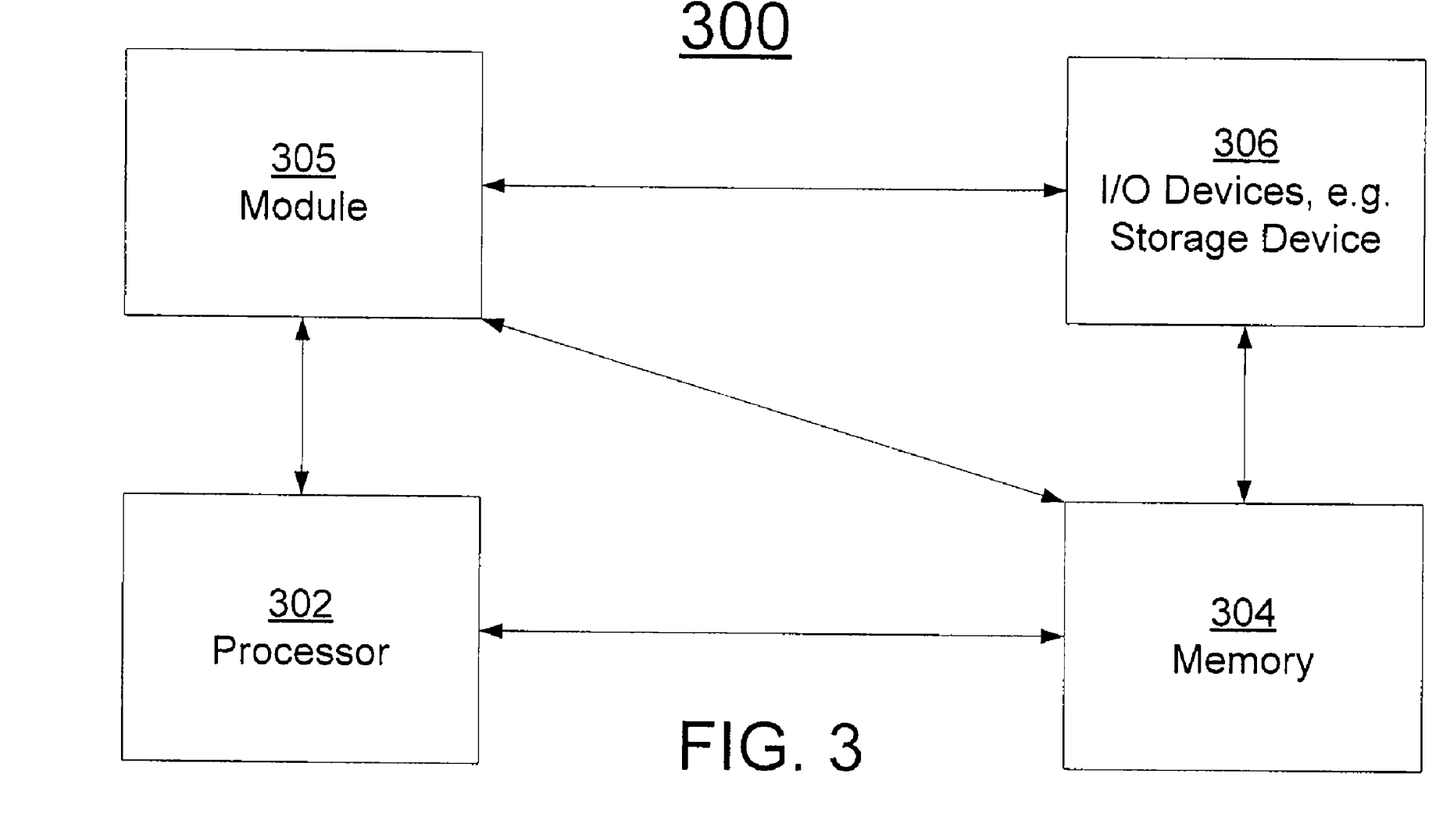
FIG. 3 illustrates a high level block diagram of a general purpose computer suitable for use in performing the functions described herein.

It should be noted that the PID 170 and other network devices can be implemented using any number of general processing devices, e.g., as shown in FIG. 3 below. In other words, the functions as performed by the PID 170 as discussed below can be implemented in any general processing devices.

In one embodiment, the enterprise customer of the enterprise network 105 has subscribed on behalf of the FMC users of the network devices 151 behind the IP PBX 128 to the NB-FMC service provided by the IMS core network 103. In one embodiment, the IP PBX 128 acts as a SIP Application Server (AS) interfacing with a Serving Call Session Control Function (S-CSCF) network element 131 in the IMS core network 103 to support the NB-FMC service features. In another alternate embodiment, the IP PBX 128 acts as a SIP Application Server (AS) interfacing with a SIP application server 126 in the IMS core network 103 to support the NB-FMC service features. Furthermore, it also facilitates the access of customer premise IP PBX service logic and data by the service provider network.

In one embodiment, a user may have a mobile endpoint device, such as mobile devices 110 and 111. Note that the mobile device can be a cellular mobile device, or a Wi-Fi and cellular mobile device. The mobile device is used by the user to gain access to the NB-FMC service functionality. The mobile device can be a compliment to a fixed wireline device that the user also maintains as part of the NB-FMC service (i.e., a wireline phone).

An NB-FMC mobile device requires an NB-FMC client software in order to receive wireline service features to the mobile device. The supported functionality via the NB-FMC client is user registration, feature invocation, mid call signaling and, in special cases, dual mode (Wi-Fi and cellular) services.

In one embodiment, mobile device 110, e.g., an NB-FMC device, is registered with the Internet Protocol Multimedia Subsystem (IMS) core network 103 and the user related information is stored in both the IMS core network 103 and on the customer premise PBX 124 to provide integrated NB-FMC service features to mobile device 110.

To illustrate, the user of the mobile device 110, who is associated with the enterprise network 104 (e.g., an employee associated with the enterprise that operates the enterprise network), may want the same service features that are currently available from the customer premise PBX 124 to be made available to the mobile device 110. Furthermore, the user may also want access to the network-based service features currently provided by the IMS core network 103 to the customer premise-based PBX. In other words, the mobile user wants access to both the same customer premise-based PBX and network-based service features that are available when using the wireline device.

In one embodiment, mobile device 111, e.g., an NB-FMC device, is registered with the Internet Protocol Multimedia Subsystem (IMS) core network 103 and the user related information is stored in both the IMS core network 103 and on the customer premise IP PBX 128 to provide integrated NB-FMC service features to mobile device 111.

Similarly, the user of the mobile device 111, who is associated with the enterprise network 105 (e.g., an employee associated with the enterprise that operates the enterprise network), may want the same service features that are currently available from the customer premise IP PBX 128 to be made available to the mobile device 111. Furthermore, the user may also want access to the network-based service features currently provided by the IMS core network 103 to the customer premise-based PBX. In other words, the mobile user wants access to both the same customer premise-based PBX and network-based service features that are available when using the wireline device.

In one embodiment, an NB-FMC mobile device, such as the mobile devices 110 and 111, can employ either a Session Initiation Protocol (SIP) based NB-FMC client or a non-SIP based NB-FMC client. An NB-FMC SIP client may use the capabilities inherent in the third generation (3G) wireless network to provide NB-FMC integrated data and voice services as well as dual mode services, while a non-SIP NB-FMC client may use the capabilities of the second generation (2G) and the two and a half generation (2.5 G) wireless networks to receive NB-FMC service experience by using well established communications protocol, such as Dual Tone Multi-Frequency (DTMF) signaling. By supporting the various mobile device client configurations, the present invention serves a broad variety of mobile endpoint devices.

In addition to supporting mobile endpoint devices, the present invention can be similarly extended to support Wi-Fi wireless endpoint devices, Public Switched Telephone Network (PSTN) and IP endpoint devices. For those extended endpoint devices that cannot dynamically register with the IMS core network 103 (also known as clientless device) via the normal IMS-based registration procedures (i.e., the 2-stage registration process), those endpoint devices are provisioned in the IMS core network 103 as registered in order to gain access to the NB-FMC service features. In one embodiment, the user profile and authorization information is statically provisioned in the IMS core network 103. This provisioning process allows clientless devices that cannot dynamically register with NB-FMC AS 125 in the IMS core network 103, such as mobile or wireline phones, to be presented as the calling party that can receive NB-FMC service features.

In one embodiment, the NB-FMC AS 125 is also capable of providing protocol interworking services to allow endpoint devices in various types of access networks including circuit switched mobile, circuit switched PSTN, and IP based access networks to communicate with the IMS core network 103 for call session establishment and management purposes. NB-FMC AS 125 is a multi-modal AS supporting multiple signaling protocols.

In particular, NB-FMC AS 125 is capable of storing the original called party number, or a dialed number, of a NB-FMC call request and assigning a temporary routing tag (or a temporary routing number) to temporarily replace the called party number of the NB-FMC call request. The NB-FMC AS 125 keeps track of the mapping of the stored called party number and the assigned temporary routing tag for future steps of the call processing. In one embodiment, the routing tag temporarily replaces the called party number of a call request and is used to route the call request sent into the IMS core network 103 using various access technologies, e.g., mobile, PSTN, or IP access, to receive consistent treatment of NB-FMC services.

For example, when the I-CSCF 130 in the IMS core network 103 receives a SIP INVITE message associated with the NB-FMC call request with the called party number having the assigned temporary routing tag, the I-CSCF 130 via a query with a HSS will route the SIP INVITE message to the NB-FMC AS 125 for processing. NB-FMC 125, which has been keeping track of the called party number and the assigned temporary routing tag mapping, then replaces the temporary routing tag in the called party number field in the SIP INVITE message with the previously stored original called party number, or dialed number. For example, the NB-FMC 125 returns a Public User Identifier (PUID) in the PAI field of the INVITE message that can be used to access the service profile for the originating FMC user.

Note that the storage of the dialed number and the assignment of the temporary routing tag involve different access technologies as previously mentioned. Therefore, the NB-FMC AS 125 needs to support signaling protocols associated with the different access technologies to provide the storage and the assignment service capabilities. In particular, the NB-FMC AS 125 provides protocol support of Transaction Capabilities Application Part (TCAP) signaling protocol if the NB-FMC call request originates in a PSTN environment. The NB-FMC AS 125 may provide protocol support of Customized Applications for Mobile networks Enhanced Logic (CAMEL) and Mobile Application Part (MAP) signaling protocols if the NB-FMC call request originates in a cellular network environment. The NB-FMC AS 125 may provide protocol support of SIP signaling protocol if the NB-FMC call request originates in an IP network environment and so on.

Broadly defined, TCAP is a signaling protocol for Signaling System 7 (SS7) networks. Mobile Application Part (MAP) is a SS7 protocol which provides an application layer for the various nodes in Global System for Mobile communications (GSM) and Universal Mobile Telecommunications System (UMTS) mobile core networks and General Packet Radio Service (GPRS) core networks. Customized Applications for Mobile networks Enhanced Logic (CAMEL) is a set of standards for GSM core networks or UMTS core networks to enable a service provider to define enhanced services over standard GSM and UMTS services.

Furthermore, in one embodiment NB-FMC AS 125 contains Voice Call Continuity (VCC) and Service Centralization and Continuity (SCC) functionalities defined by the 3GPP IMS standards that allow the support of circuit switched devices in the IMS core network 103. Wireline IP endpoint devices also receive services from NB-FMC AS 125 through the IMS core network 103 upon which the NB-FMC architecture is based.

In one embodiment, for PSTN users who have not converted to IP connectivity, the TDM network is supported by the NB-FMC AS 125 by communicating through the use of Advanced Intelligent Network (AIN) triggers and SS7/TCAP signaling protocols.

In one embodiment, SIP AS 126 is an AS from which traditional enterprise service features are provided. For example, this SIP AS supplies the basic service features that the NB-FMC architecture extends to the enterprise mobile users, e.g., users of mobile devices 110 and 111. SIP AS 126 also provides the same basic service features to existing fixed wireline users, e.g., users of wireline phones 151 and 154.

Basic service features provided by SIP AS 126 include, but are not limited to, digit translation, call screening, time of day routing, abbreviated or short dialing, conferencing, and messaging (based on information stored in IMS core network 103 for the identity asserted by mobile device). SIP AS 126 provides the appropriate features depending on the feature package subscribed by a user and the corresponding endpoint device capabilities associated with the user. Therefore, the user on mobile devices 111 may receive features appropriate for the device while the same user using wireline phone 151 would receive the same features plus additional features that are appropriate for a user in a fixed wireline environment.

Broadly defined, a Call Session Control Function (CSCF) network element is an IP Multimedia Services (IMS) based session control layer network element that is responsible for call session setup, mid-session control, and teardown. In particular, an Interrogating CSCF (I-CSCF) is a network element that provides topology hiding and helps to forward requests between a CSG and a Serving CSCF (S-CSCF) network element as well as Application Servers (AS). A Serving CSCF (S-CSCF) is a network element that provides session control, call signaling routing to applications, and SIP registrar functions. An Application server (AS) is a network element that hosts and executes service specific applications on behalf of an IMS core network, and interfaces with the S-CSCF using a communication protocol, e.g., a Session Initiation Protocol (SIP).

FIG. 1 illustrates an exemplary network based FMC communication network 100 related to the present invention. In FIG. 1, a call request is originated by a mobile device in the mobile core network 101.

If the mobile device is a SIP FMC device, capable of SIP registration, then mobile core network 101 recognizes this call as an originating FMC call and performs the processing required to assign a temporary routing number to this request to route it to the IMS Core 103 for originating service feature processing using via SBC 121 and S-CSCF 131 using flow 198. The mobile device sends a SIP INVITE message to NB-FMC AS 125 via the packet switched portion of the mobile core network 101 with the Private Preferred Identity (PPI)/From header set to the Public User Identifier (PUID) associated with the user of the mobile device and the Request Uniform Resource Identifier (R-URI) set to the dialed number.

Note that the NB-FMC AS 125 is capable of storing the original called party number, or the dialed number, of a NB-FMC call request and assigning a routing tag to temporarily replace the called party number field of the NB-FMC call request. NB-FMC AS 125 also keeps track of the mapping of the stored called party number and the assigned temporary routing tag for future steps of the call processing. NB-FMC AS 125 sends an INVITE back to the originating mobile device to provide an IMS Routing Number (IMRN), a temporary routing tag, with the Private Asserted Identity (PAI)/From header set to the NB-FMC AS PSI and the R-URI set to the IP address of the originating mobile device.

Then, the mobile device initiates a circuit switched call request using flow 171 and flow 173 to CSG 122 via Mobile Switching Center (MSC) 129. When the call request reaches the CSG 122, a Session Initiation Protocol (SIP) INVITE message is created and sent to the I-CSCF 130 using flow 190. The PAI/from header of the INVITE message is set to the Mobile Subscriber Integrated Service Digital Network (MSISDN) number of the mobile device and the R-URI header of the INVITE message is set to the previously obtained IMRN.

In accordance with standard IMS core processing, the I-CSCF 130 then queries Home Subscriber Server (HSS) 160 using flow 175. HSS 160 maps the IMRN PSI to the SIP URI of the NB-FMC AS 125 and sends it back to the I-CSCF 130 for processing.

In accordance with standard IMS core processing, the I-CSCF 130 sends the INVITE message to the Network Based FMC AS 125 using flow 176. NB-FMC AS 125 associates this INVITE message with the original INVITE message sent by the mobile device. NB-FMC AS 125 then sends and INVITE message to S-CSCF 131 using flow 174 with the From header set to the PUID associated with the user of the mobile device that can be used to access the service profile for the user, the PAI header set to the phone number of the mobile device (e.g., the MSISDN number), and the R-URI header set to the original dialed number captured previously by NB-FMC AS 125.

In accordance with standard IMS Core processing, the S-CSCF 131 determines, based on the service profile associated with the PUID of the user of the mobile device, that SIP AS 126 needs to be accessed next. Thus, the S-CSCF 131 sends the INVITE message to SIP AS 126 using flow 193 for call originating processing. Call originating processing at SIP AS 126 includes, but is not limited to, functions such as digit translation, call screening, time of day routing (based on information stored in the IMS core network 103 for the identity asserted by mobile device). When the relevant processing is completed by the SIP AS 126, it will send the INVITE message back to the S-CSCF 131 using flow 193.

S-CSCF 131 then determines the next AS associated with the NB-FMC services that needs to be accessed next.

If the mobile device is a non-SIP FMC device, incapable of SIP registration, then mobile core network 101 recognizes this call as an originating FMC call at the MSC 129. The call request is sent from the non-SIP FMC mobile device to MSC 129 using flow 171. The MSC 129 then sends a Customized Application for Mobile Network Enhanced Logic (CAMEL) request to the NB-FMC AS 125 using flow 172.

The NB-FMC AS 125 performs the processing required to assign a temporary routing number to this request. Note that the NB-FMC AS 125 is capable of storing the original called party number, or the dialed number, of a NB-FMC call request and assigning a routing tag to temporarily replace the called party number field of the NB-FMC call request. NB-FMC AS 125 also keeps track of the mapping of the stored called party number and the assigned temporary routing tag for future steps of the call processing.

The NB-FMC AS 125 sends a CAMEL response to the MSC 129 using flow 172 to provide an IMS Routing Number (IMRN), a temporary routing tag.

Then, the MSC 129 routes the call request to the CSG 122 using flow 173. When the call request reaches the CSG 122, a Session Initiation Protocol (SIP) INVITE message is created and sent to the I-CSCF 130 using flow 190. The PAI/from header of the INVITE message is set to the Mobile Subscriber Integrated Service Digital Network (MSISDN) number of the mobile device and the R-URI header of the INVITE message is set to the previously obtained IMRN.

In accordance with standard IMS core processing, the I-CSCF 130 then queries Home Subscriber Server (HSS) 160 using flow 175. HSS 160 maps the IMRN PSI to the SIP URI of NB-FMC AS 125 and sends it back to the I-CSCF 130 for processing.

In accordance with standard IMS core processing, the I-CSCF 130 sends the INVITE message to Network Based FMC AS 125 using flow 176. The NB-FMC AS 125 associates this INVITE message with the original CAMEL request sent by the MSC 129. The NB-FMC AS 125 then sends an INVITE message to I-CSCF 130 using flow 176 with the From header set to the PUID associated with the user of the mobile device that can be used to access the service profile for the user, the PAI header set to the phone number of the mobile device (e.g., the MSISDN number), and the R-URI header set to the original dialed number captured previously by NB-FMC AS 125.

The I-CSCF 130 continues standard IMS processing, and once it determines the S-CSCF 131 that should be accessed for originating processing, the I-CSCF 130 sends the INVITE message to the S-CSCF 131 using flow 192. Note that the I-CSCF 130 queries HSS 160 using flow 175 to obtain the S-CSCF, S-CSCF 131 in this case, in accordance with standard IMS core processing.

In accordance with standard IMS Core processing, the S-CSCF 131 determines, based on the service profile associated with the PUID of the user of the mobile device, that SIP AS 126 needs to be accessed next. Thus, the S-CSCF 131 sends the INVITE message to SIP AS 126 using flow 193 for call originating processing. Call originating processing at SIP AS 126 includes, but is not limited to, functions such as digit translation, call screening, time of day routing (based on information stored in the IMS core network 103 for the identity asserted by mobile device). When the relevant processing is completed by the SIP AS 126, it will send the INVITE message back to the S-CSCF 131 using flow 193.

S-CSCF 131 then determines the next AS associated with the NB-FMC services that needs to be accessed next.

In order to provide service to a user who has service logic and data residing in the PBX, the present invention provides a solution that enables the network to access the PBX service logic and data during network processing. In the case that PBX 124 is determined to be accessed next, the S-CSCF 131 determines that the PID 170, which is acting as a SIP AS associated with the IMS core network 103, should be accessed by processing an Initial Filter Criteria (iFC) in a standard manner. S-CSCF 131 sends the INVITE message to the PID 170 via the SBC 123 over the PID AS interface using flow 194. The PID 170 receives the SIP message from the IMS core network 103 and performs interworking functions for this message and all subsequent messages in order to access the PBX 124 when needed in a format that is compatible with the PBX 124. The PID 170 communicates with the PBX 124 as needed using flow 194a.

The PBX 124 retrieves the service logic and data associated with the user and sends the retrieved service logic and data back to S-CSCF 131 via PID 170 using flow 194. For example, the PID 170 may use the information received from the PBX 124 to update/change the R-URI in the message that is being processed. The PID 170 then sends the updated INVITE message to the S-CSCF 131 using flow 194.

In another example, if the IP PBX 128 is determined to be accessed next, the S-CSCF 131 accesses the IP PBX 128, which is acting as an AS associated with the IMS core network 103, using flow 195. The S-CSCF 131 sends the INVITE message to the IP PBX 128 via the SBC 123. The IP PBX 128 then retrieves the service logic and data associated with the user and sends the retrieved service logic and data back to S-CSCF 131 using flow 195.

Eventually, the S-CSCF 131 determines that call originating processing is complete. Standard IMS Core processing follows and the call is set up. When the call is eventually answered, a bearer path that does not go through PBX 124 or IP PBX 128 can be established depending on the retrieved service logic and data pertaining to each scenario described above. In other words, this approach provides a significant amount of savings in terms of bandwidth since the bearer path does not need to traverse, e.g., from the SBC 123 to the PBX 124 and then back from the PBX 124 to the SBC 123 (broadly defined as the hairpin).

Even though the aforementioned scenarios are related to a call originating call request, similar scenarios apply to call terminating call request as well. In addition, even though the aforementioned scenarios are related to a call originated by a mobile device using a cellular access network, similar scenarios apply to other access technologies such as PSTN and IP access configurations. Furthermore, it should be noted that the present invention also works with subsequent signaling messages after the INVITE message. For example, signaling could be routed through the PID 170 acting as a SIP AS. Based on any subsequent signaling, the PID 170 could determine that data or service logic in the PBX 124 needs to be accessed. This could be based on subsequent session setup signaling, mid-call signaling or session teardown signaling.

Note that the benefits of the present invention shown in FIG. 1 can be extended to calls originating from existing wireline devices that are accessed via a customer premise PBX.

Figure 2:
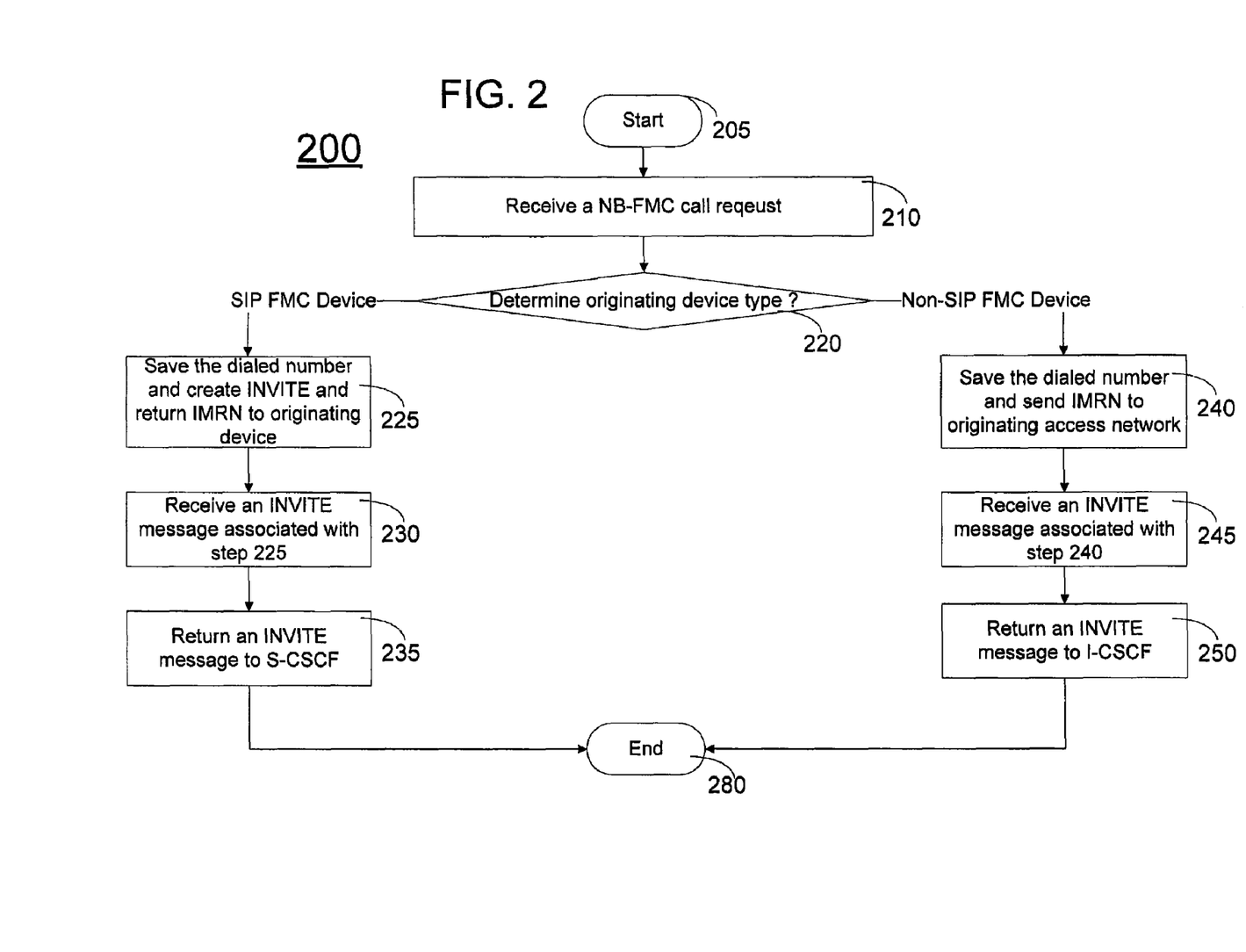
FIG. 2 illustrates a flowchart of a method of processing a NB-FMC call request in a NB-FMC communication network of the present invention.

FIG. 2 illustrates a flowchart of a method 200 of processing a NB-FMC call request in a NB-FMC communication network by a NB-FMC AS of the present invention. Method 200 starts in step 205 and proceeds to step 210.

In step 210, the NB-FMC AS receives a call request associated with NB-FMC services to be processed. The call request can be originated from an FMC device, such as a mobile device capable of SIP registration, or from a non-FMC device, such as a mobile device incapable of SIP registration. If the call request is originated from a SIP FMC device, the call request is received via a S-CSCF. If the call request is originated from a non-SIP FMC device, the call request is received from the access network of the originating device, e.g., a CAMEL request from a MSC in an originating mobile core network.

In step 220, the NB-FMC determines if the call request is originated from an SIP FMC device or a non-SIP FMC device. If the originating device is a SIP FMC device, the method proceeds to step 225; otherwise, the method proceeds to step 240.

In step 225, the NB-FMC AS creates an SIP INVITE message and sends an IMRN back to the originating SIP FMC device via the S-CSCF. The SIP INVITE message comprises a PAI/From header set to the NB-FMC AS PSI and the U-URI header set to the IP address of the originating SIP FMC device. The NB-FMC AS also saves the dialed number of the call request for later use.

In step 230, the NB-FMC AS subsequently receives an INVITE message associated with the call request processed in step 225. The INVITE message is received from an I-CSCF.

In step 235, the NB-FMC AS sends an INVITE message to a S-CSCF with the From header set to the Public User Identifier (PUID) of the user of the originating SIP FMC device, the PAI header set to the phone number of the originating SIP FMC device, e.g., an MSISDN number, and the R-URI header set to the dialed number saved in step 225.

In step 240, the NB-FMC AS saves the dialed number from the call request and sends an IMRN back to the originating access network serving the non-SIP FMC client, e.g., sending a CAMEL response to an MSC in the originating mobile core network.

In step 245, the NB-FMC AS subsequently receives an INVITE message associated with the call request processed in step 240. The INVITE message is received from an I-CSCF.

In step 250, the NB-FMC AS sends an INVITE message back to the I-CSCF with the From header set to the Public User Identifier (PUID) of the user of the originating non-SIP FMC device, the PAI header set to the phone number of the originating non-SIP FMC device, e.g., an MSISDN number, and the R-URI header set to the dialed number saved in step 240.

The method ends in step 280.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for enabling network based Fixed Mobile Convergence, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for enabling network based Fixed Mobile Convergence can be loaded into memory 304 and executed by processor 302 to implement the functions as discussed above. As such, the present process 305 for enabling network based Fixed Mobile Convergence (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a network based fixed mobile convergence service via a communication network, comprising:
   receiving a network based fixed mobile convergence call request originating from a non-session initiation protocol network based fixed mobile convergence endpoint device; and
   processing the network based fixed mobile convergence call request using a single hosted network based fixed mobile convergence application server, wherein the processing of the network based fixed mobile convergence call request comprises:
      assigning an internet protocol multimedia subsystem routing number to temporarily replace an original dialed number of the network based fixed mobile convergence call request;
      storing a mapping of the internet protocol multimedia subsystem routing number to the original dialed number;
      associating a received session initiation protocol invite message from an interrogating call session control function network element with the network based fixed mobile convergence call request; and
      sending a modified session initiation protocol invite message with a from header set to a public user identifier associated with a user of the non-session initiation protocol network based fixed mobile convergence endpoint device, a private asserted identity header set to a phone number of the non-session initiation protocol endpoint device, and a request uniform resource identifier header set to the original dialed number to the interrogating call session control function network element for processing.

2. The method of claim 1, wherein the communication network comprises an internet protocol multimedia subsystem core network and a mobile core network.

3. The method of claim 2, wherein the internet protocol multimedia subsystem core network is connected to the mobile core network via a session border controller and a circuit switched gateway.

4. The method of claim 1, wherein the assigning comprises:
   using a transaction capabilities application part signaling protocol by the network based fixed mobile convergence application server to support the assigning when the network based fixed mobile convergence call request is received from a circuit switched telephone network;
   using a customized applications for mobile networks enhanced logic request and response and a mobile application part signaling protocol to support the assigning when the network based fixed mobile convergence call request is received from a cellular service network; and
   using a session initiation protocol signaling protocol to support the assigning when the network based fixed mobile convergence call request is received from an internet protocol network.

5. A method for providing a network based fixed mobile convergence service via a communication network, comprising:
   receiving a network based fixed mobile convergence call request originating from a session initiation protocol network based fixed mobile convergence endpoint device; and
   processing the network based fixed mobile convergence call request using a single hosted network based fixed mobile convergence application server, wherein the processing of said the network based fixed mobile convergence call request comprises:
      assigning an internet protocol multimedia subsystem routing number to temporarily replace an original dialed number of the network based fixed mobile convergence call request;
      storing a mapping of the internet protocol multimedia subsystem routing number to the original dialed number;
      associating a received session initiation protocol invite message from an interrogating call session control function network element with the network based fixed mobile convergence call request; and sending a modified session initiation protocol invite message with a from header set to a public user identifier associated with a user of the session initiation protocol network based fixed mobile convergence endpoint device, a private asserted identity header set to a phone number of the session initiation protocol network based fixed mobile convergence endpoint device, and a request uniform resource identifier header set to the original dialed number to a serving call session control function network element for processing.

6. The method of claim 5, wherein the assigning comprises:
using a session initiation protocol signaling protocol to support the assigning when the network based fixed mobile convergence call request is received from an internet protocol network.

7. A non-transitory computer-readable storage medium having stored thereon a plurality of instructions, the plurality of instructions including instructions which, when executed by a processor of a single hosted network based fixed mobile convergence application server, cause the processor to perform operations for providing a network based fixed mobile convergence service via a communication network, the operations comprising:

receiving a network based fixed mobile convergence call request originating from a non-session initiation protocol network based fixed mobile convergence endpoint device; and processing the network based fixed mobile convergence call request by the single hosted network based fixed mobile convergence application server, wherein the processing of the network based fixed mobile convergence call request comprises:
assigning an internet protocol multimedia subsystem routing number to temporarily replace an original dialed number of the call request;
storing a mapping of the internet protocol multimedia subsystem routing number to the original dialed number;
associating a received session initiation protocol invite message from an interrogating call session control function network element with the call request; and
sending a modified session initiation protocol invite message with a from header set to a public user identifier associated with a user of the non-session initiation protocol network based fixed mobile convergence endpoint device, a private asserted identity header set to a phone number of the non-session initiation protocol endpoint device, and a request uniform resource identifier header set to the original dialed number to the interrogating call session control function network element for processing.

8. The non-transitory computer-readable storage medium of claim 7, wherein the communication network comprises an internet protocol multimedia subsystem core network and a mobile core network.

9. The non-transitory computer-readable storage medium of claim 8, wherein the internet protocol multimedia subsystem core network is connected the mobile core network via a session border controller and a circuit switched gateway.

10. The non-transitory computer-readable storage medium of claim 7, wherein the assigning comprises:
using a transaction capabilities application part signaling protocol by the network based fixed mobile convergence application server to support the assigning when the network based fixed mobile convergence call request is received from a circuit switched telephone network;
using a customized applications for mobile networks enhanced logic request and response and a mobile application part signaling protocol to support said the assigning when the network based fixed mobile convergence call request is received from a cellular service network; and
using a session initiation protocol signaling protocol to support the assigning when the network based fixed mobile convergence call request is received from an internet protocol network.

11. A non-transitory computer-readable storage medium having stored thereon a plurality of instructions, the plurality of instructions including instructions which, when executed by a processor of a single hosted network based fixed mobile convergence application server, cause the processor to perform operations for providing a network based fixed mobile convergence service via a communication network, the operations comprising:

receiving a network based fixed mobile convergence call request originating from a session initiation protocol network based fixed mobile convergence endpoint device; and processing the network based fixed mobile convergence call request by the single hosted network based fixed mobile convergence application server, wherein the processing of the network based fixed mobile convergence call request comprises:
assigning an internet protocol multimedia subsystem routing number to temporarily replace an original dialed number of the call request;
storing a mapping of the internet protocol multimedia subsystem routing number to the original dialed number;
associating a received session initiation protocol invite message from an interrogating call session control function network element with the network based fixed mobile convergence call request; and
sending a modified session initiation protocol invite message with a from header set to a public user identifier associated with a user of the session initiation protocol network based fixed mobile convergence endpoint device, a private asserted identity header set to a phone number of the session initiation protocol network based fixed mobile convergence endpoint device, and a request uniform resource identifier header set to the original dialed number to a serving call session control function network element for processing.

12. The non-transitory computer-readable storage medium of claim 11, wherein the assigning comprises:
using a session initiation protocol signaling protocol to support the assigning when the network based fixed mobile convergence call request is received from an internet protocol network.

13. A single hosted network based fixed mobile convergence application server for providing a network based fixed mobile convergence service via a communication network, comprising:
a processor; and
a computer-readable medium in communication with the processor, the computer-readable medium having stored thereon a plurality of instructions, the plurality of instructions including instructions which, when executed by the processor, cause the processor to perform operations for providing a network based fixed mobile convergence service via a communication network, the operations comprising:

receiving a network based fixed mobile convergence call request originating from a non-session initiation protocol based fixed mobile convergence endpoint device; and processing the network based fixed mobile convergence call request by the single hosted network based fixed mobile convergence application server, wherein the processing of the network based fixed mobile convergence call request comprises:

assigning an internet protocol multimedia subsystem routing number to temporarily replace an original dialed number of the network based fixed mobile convergence call request;

storing a mapping of the internet protocol multimedia subsystem routing number to the original dialed number;

associating a received session initiation protocol invite message from an interrogating call session control function network element with the network based fixed mobile convergence call request; and sending a modified session initiation protocol invite message with a from header set to a public user identifier associated with a user of the non-session initiation protocol network based fixed mobile convergence endpoint device, a private asserted identity header set to a phone number of the non-session initiation protocol endpoint device, and a request uniform resource identifier header set to the original dialed number to the interrogating call session control function network element for processing.

14. The single hosted network based fixed mobile convergence application server of claim 13, wherein the communication network comprises an internet protocol multimedia subsystem core network and a mobile core network.

15. The single hosted network based fixed mobile convergence application server of claim 14, wherein the internet protocol multimedia subsystem core network is connected to the mobile core network via a session border controller and a circuit switched gateway.

16. The single hosted network based fixed mobile convergence application server of claim 13, wherein the assigning comprises:

using a transaction capabilities application part signaling protocol by the network based fixed mobile convergence application server to support the assigning when the network based fixed mobile convergence call request is received from a circuit switched telephone network;

using a customized applications for mobile network enhanced logic request and response and a mobile application part signaling protocol to support the assigning when the network based fixed mobile convergence call request is received from a cellular service network; and using a session initiation protocol signaling protocol to support the assigning when the network based fixed mobile convergence call request is received from an internet protocol network.

17. A single hosted network based fixed mobile convergence application server for providing a network based fixed mobile convergence service via a communication network, comprising:

a processor; and a computer-readable medium in communication with the processor, the computer-readable medium having stored thereon a plurality of instructions, the plurality of instructions including instructions which, when executed by the processor, cause the processor to perform operations, the operations comprising:

receiving a network based fixed mobile convergence call request originating from a session initiation protocol based fixed mobile convergence endpoint device; and processing the network based fixed mobile convergence call request by the single hosted network based fixed mobile convergence application server, wherein the processing means comprises:

assigning an internet protocol multimedia subsystem routing number to temporarily replace the an original dialed number of the network based fixed mobile convergence call request;

storing a mapping of the internet protocol multimedia subsystem routing number to the original dialed number;

associating a received session initiation protocol invite message from an interrogating call session control function network element with the network based fixed mobile convergence call request; and sending a modified session initiation protocol invite message with a from header set to a public user identifier associated with a user of the session initiation protocol network based fixed mobile convergence endpoint device, a private asserted identity header set to a phone number of the session initiation protocol network based fixed mobile convergence endpoint device, and a request uniform resource identifier header set to the original dialed number to a serving call session control function network element for processing.

* * * * *